US005788775A

United States Patent [19]

Boriani et al.

[11] Patent Number: 5,788,775

[45] Date of Patent: Aug. 4, 1998

[54] SPRAY GUMMING UNIT

[75] Inventors: Silvano Boriani, Bologna; Alessandro Minarelli, Bazzano, both of Italy

[73] Assignee: G.D Societa' Per Azioni, Bologna, Italy

[21] Appl. No.: 599,792

[22] Filed: Feb. 12, 1996

[30] Foreign Application Priority Data

Feb. 14, 1995 [IT] Italy ................................ B095A0053

[51] Int. Cl.[6] ................................ B05C 11/00; B05B 7/06; B32B 31/00

[52] U.S. Cl. ................................ 118/684; 118/315; 156/357

[58] Field of Search ................................ 156/350, 351, 156/356, 364, 441.5, 442.1, 443, 446, 448, 459, 483, 363; 118/684, 685, 679, 323, 313, 315; 239/70, 550, 564

[56] References Cited

U.S. PATENT DOCUMENTS

| | | | |
|---|---|---|---|
| 3,722,468 | 3/1973 | Middleton | 118/315 |
| 4,488,665 | 12/1984 | Cocks et al. | 118/313 |
| 4,561,592 | 12/1985 | Fender | 239/587 |
| 4,844,342 | 7/1989 | Foley | 239/70 |
| 5,188,695 | 2/1993 | Colton | 156/356 |
| 5,584,932 | 12/1996 | Clark et al. | 118/669 |

FOREIGN PATENT DOCUMENTS

| | | |
|---|---|---|
| 518166 | 2/1940 | United Kingdom . |
| 1144731 | 3/1969 | United Kingdom . |
| 2042879 | 7/1981 | United Kingdom . |
| 8201832 | 10/1982 | WIPO . |

*Primary Examiner*—Laura Edwards
*Assistant Examiner*—Calvin Padgett
*Attorney, Agent, or Firm*—Ladas & Parry

[57] ABSTRACT

A unit for gumming sheet elements traveling along a given path, with the unit presenting s support set to an adjustable position facing a portion of the path, and at least one spray gumming device directed towards the path, and connected to the support by means of an adjustable connecting device for adjusting the position of the gumming device in relation to the support and in at least a first direction extending in a plane parallel to the path, and in a second direction perpendicular to the plane of the first direction, and about at least one axis parallel to the second direction.

9 Claims, 2 Drawing Sheets

SPRAY GUMMING UNIT

BACKGROUND OF THE INVENTION

The present invention relates to a spray gumming unit.

The present invention is particularly suitable for production machines, especially packing machines—to which the following description refers purely by way of example—requiring the application of adhesive to given portions of sheet material, e.g. sheets of wrapping material or blanks which are folded to form containers and stabilized in the folded position, or to sheet material such as labels or revenue stamps which are simply affixed to backing material, e.g. paper.

Packing machines are known to employ spray gumming units located along the path of the sheets to be gummed, and each comprising gumming devices with respective spray nozzles for substantially liquid adhesive material; an adhesive tank; a pump assembly for feeding the adhesive to the nozzles; and a control device for ensuring the supply of a given quantity of adhesive from the nozzles as the sheet to be gummed travels past the gumming unit.

The gumming devices of known units of the above type are generally located side by side and parallel, in a fixed position in relation to one another and to the path of the sheets to be gummed, and are all operated at the same time. That is, the gumming devices are located in a fixed position inside a gumming station, and are so arranged as to reproduce, inside the station, the arrangement of the gumming portions on the sheet.

Known gumming units of the above type present several drawbacks. Firstly, on account of the spray devices being arranged to match the gumming portions on the sheet, the units are often bulky and substantially the same size as the sheet. Secondly, they adapt poorly to the gumming of relatively small sheets, on account of the width of the spray devices and, hence, the relatively large minimum distance between the various gumming portions. Thirdly, they cannot be used on continuously operating machines, i.e. wherein the sheets to be gummed travel at substantially constant speed as opposed to in steps.

SUMMARY OF THE INVENTION

It is an object of the present invention to provide a spray gumming unit designed to overcome the aforementioned drawbacks.

According to the present invention, there is provided a spray gumming unit for gumming a number of given portions of sheet elements traveling along a given path; the unit comprising a support mounted along a portion of said path; at least two spray gumming devices, each presenting a respective nozzle for supplying a jet of adhesive material; a tank for the adhesive material; a conduit connecting each gumming device to the tank; and valve means for controlling said conduits; characterized in that it also comprises, for each gumming device, an adjustable connecting device interposed between the gumming device and said support, for enabling the position of the gumming device to be adjusted in relation to said support; said position adjustment comprising at least one rotation about an axis.

Said valve means preferably comprise a valve for each said conduit; and a control unit being provided for selectively controlling said valves according to a given law adjustable as required.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
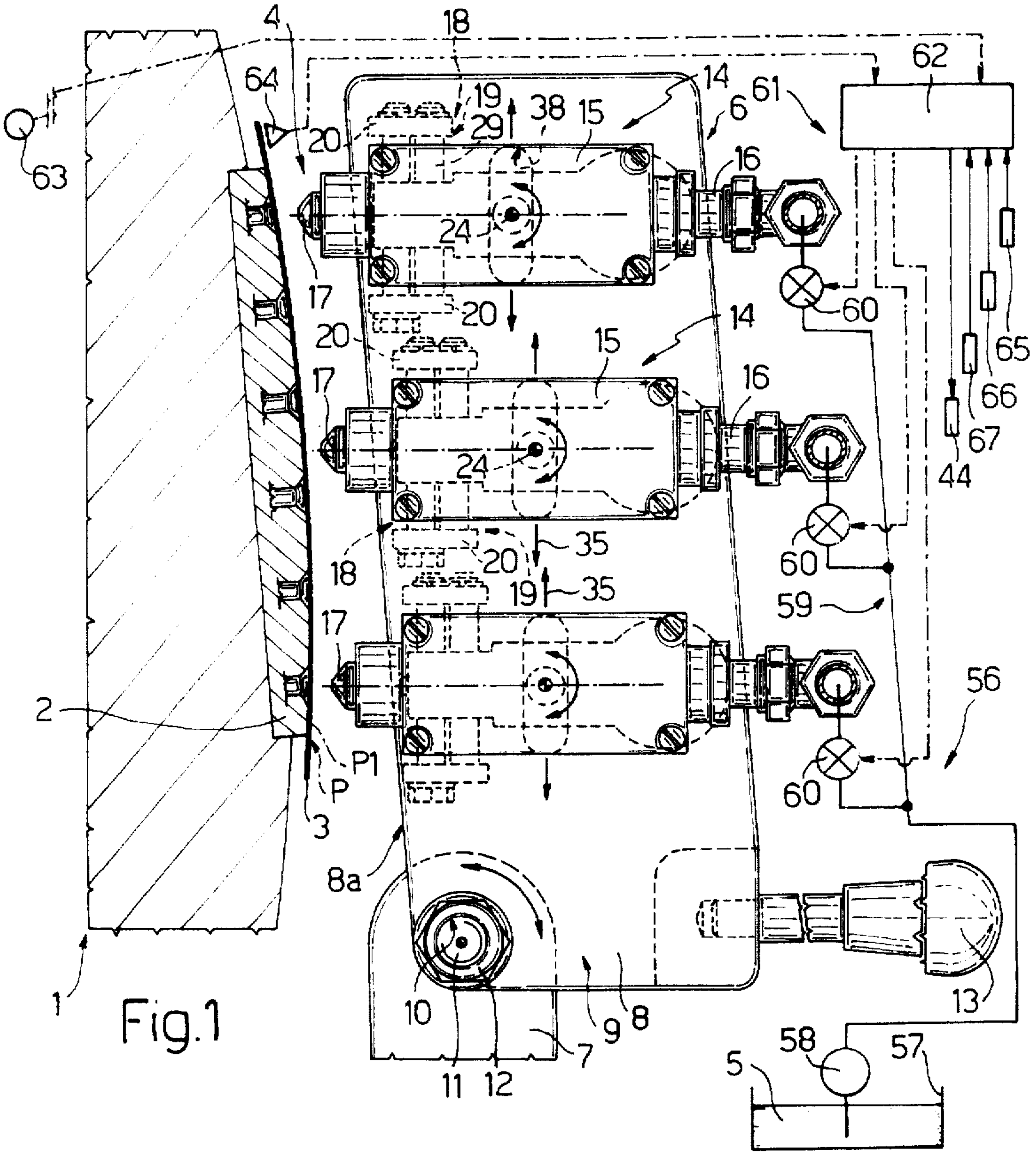
FIG. 1 shows a schematic, partially sectioned plan view, with parts removed for clarity and parts in block form, of a preferred embodiment of the gumming unit according to the present invention.
Figure 5:
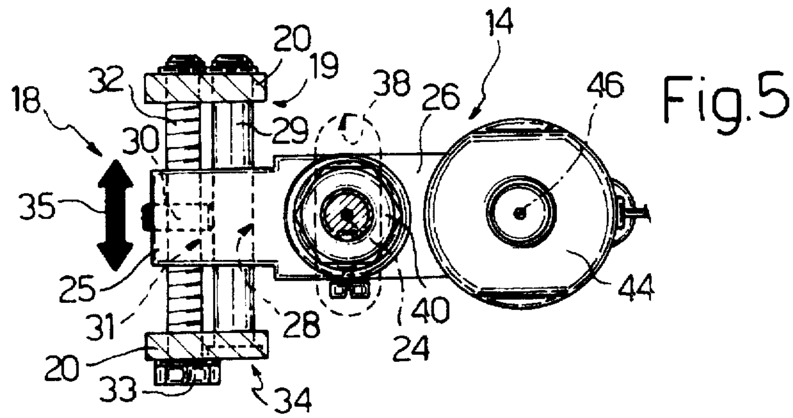
FIG. 5 shows a larger-scale section along line V—V in FIG. 2, and with parts removed for clarity, of a further detail in FIG. 1.

Number 1 in FIG. 1 indicates a conveyor wheel rotating clockwise (in FIG. 1) about its axis perpendicular to the FIG. 1 plane. Wheel 1 presents a number of peripheral suction heads 2, each for feeding a respective sheet element 3—in the example shown, a revenue stamp—along a circular path P extending parallel to the FIG. 1 plane. A portion P1 of path P extends through a gumming station 4 where given portions (not shown) of the surface of element 3 are coated with adhesive material 5 applied to element 3 by a spray gumming unit 6 fitted adjustably to a bracket 7 fixed inside station 4 and facing portion P1 of path P.

As shown in FIG. 1, unit 6 comprises a substantially rectangular plate 8 with its upper surface 9 parallel to the FIG. 1 plane and substantially coplanar with path P. Close to one corner adjacent to path P and overlapping one end of bracket 7, plate 8 presents a through hole 10 which is engaged in rotary manner by a threaded pin 11 perpendicular to the FIG. 1 plane and projecting upwards from bracket 7. The end portion of pin 11 projects above plate 8, and is engaged by a lock nut 12 for locking plate 8 in any given angular position in relation to bracket 7, for which purpose, plate 8 presents a knob 13 substantially crosswise to pin 11 and projecting outwards from the periphery of plate 8.

Figure 2:
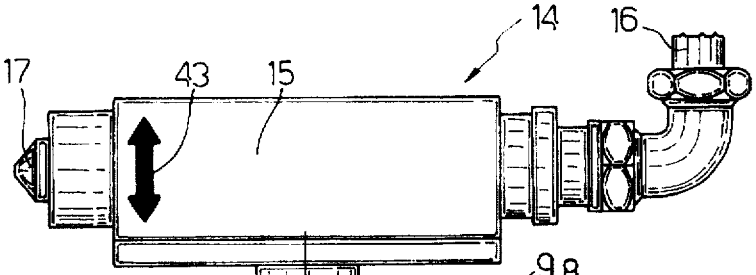
FIG. 2 shows a larger-scale, partially sectioned side view, with parts removed for clarity, of a detail in FIG. 1.

With reference to FIGS. 1 and 2, unit 6 also comprises a number of known spray devices 14 arranged side by side along portion P1 of path P, and each comprising a substantially parallelepiped central body 15 facing surface 9 of plate 8 and presenting an inlet conduit 16 and an outlet nozzle 17 directed towards portion P1 of path P and for emitting a jet (not shown) of adhesive material 5 onto element 3 traveling through station 4.

Each spray device 14 comprises an adjustable device 18 for connecting it to a fork 19 defined by two parallel brackets 20 extending downwards from the bottom surface 21 of plate 8 and located adjacent to the edge 8a of plate 8 facing portion P1 of path P.

As shown in FIGS. 2 to 5, device 18 comprises a tubular body 22 facing surface 21 of plate 8, and presenting a cylindrical through hole 23, the axis 24 of which extends parallel to pin 11. On one side, tubular body 22 presents a longitudinal rib 25 extending substantially the whole length of body 22 and extending outwards between brackets 20 of fork 19. On the other side, tubular body 22 presents an appendix 26 extending outwards from the end of body 22 opposite that facing surface 21, and in a direction diametrically opposite that of rib 25 in relation to hole 23, and which is fitted on its free end with a substantially circular plate 27 parallel to plate 8. Rib 25 presents two cylindrical through holes 28 formed one over the other and parallel to edge 8a of plate 8, and which are engaged in sliding manner by respective guide rods 29 extending between and integral with brackets 20 of fork 19, and which are locked in position in relation to rib 25 by respective pins 30 fitted through rib 25 and radially in relation to holes 28. Rib 25 also presents a threaded hole 31 parallel to holes 28 and engaged by a screw 32 supported in rotary, axially-fixed manner by brackets 20 and presenting an externally accessible head 33.

Together with rib 25, rods 29 and screw 32 define an adjusting and guide device 34 which, as explained more clearly later on, provides for adjusting the position of respective spray device 14 in a first direction 35 substantially parallel to plate 8 and to portion P1 of path P.

Figure 3:
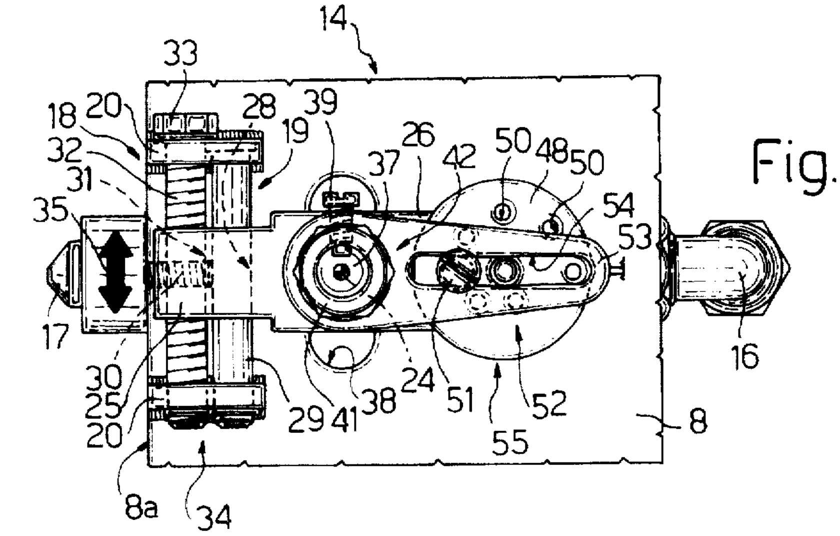
FIG. 3 shows an underside view of the FIG. 2 detail.
Figure 4:
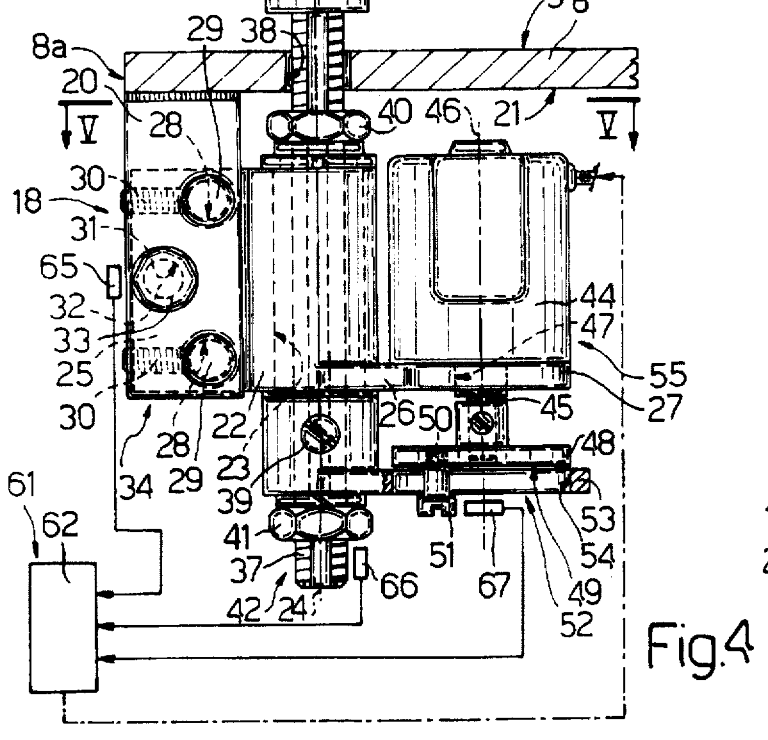
FIG. 4 shows a larger-scale axial section of a detail in FIG. 2.
Figure 4:
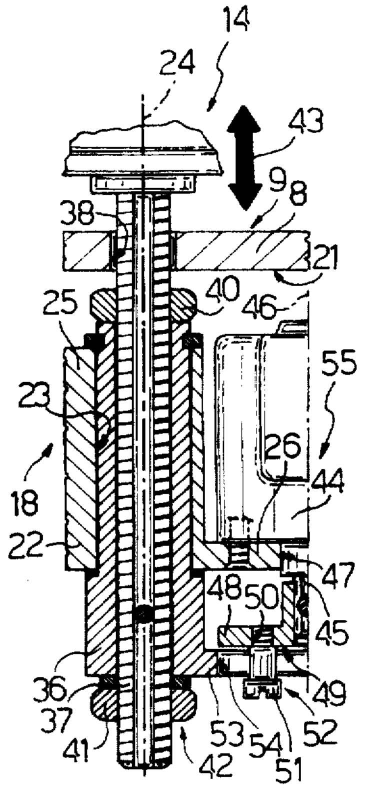

As shown more clearly in FIG. 4, hole 23 is fitted through in rotary, axially-fixed manner with a sleeve 36 coaxial with axis 24 and in turn fitted through with an externally threaded shaft 37, the top end portion of which projects from sleeve 36, extends through a slot 38 formed through plate 8 and parallel to direction 35, and is connected integral with body 15. Shaft 37 is fitted in axially-sliding manner to sleeve 36, is fixable axially to sleeve 36 by means of a radial pin 39 (FIG. 3), and is fitted with a nut 40 and a lock nut 41 cooperating with opposite ends of sleeve 36. Together with sleeve 36, shaft 37 and nuts 40 and 41 define an adjusting and guide device 42 for transmitting to body 15 the movements imparted by device 34 in direction 35, and for adjusting the position of respective spray device 14 in a second direction 43 substantially perpendicular to plate 8 and crosswise to portion P1 of path P.

As shown in FIGS. 2 and 3, plate 27 supports a reversible step motor 44 located between plate 27 and plate 8, and the output shaft 45 of which presents an axis 46 parallel to axis 24, and extends downwards through a hole 47 formed through plate 27. The free end of shaft 45 beneath plate 27 is fitted with a plate 48 parallel to plate 27 and presenting, on the surface 49 opposite that facing shaft 45, a number of holes 50 arranged in a spiral about axis 46. Any one of holes 50 is engaged by a screw 51 forming the sliding pin of a crank and slotted link mechanism 52 wherein plate 48 forms a crank varying in length according to the distance between screw 51 and axis 46, and which provides for imparting a given oscillation, varying with the position of screw 51, to a link defined by a flat appendix 53 extending radially outwards from the end of sleeve 36 adjacent to lock nut 41 and in front of surface 49 of plate 48, and presenting a slot 54 extending along appendix 53 in a radial direction in relation to axis 24 and engaged in sliding manner by screw 51.

Motor 44 and mechanism 52 define an adjusting device 55 for imparting to body 22 a given angular position or given oscillation of given frequency about axis 24.

As shown in FIG. 1, unit 6 comprises a supply circuit 56 in turn comprising a tank 57 for material 5, and a pump 58, the inlet of which communicates with tank 57, and the outlet of which communicates with a manifold 59 communicating with conduits 16 via respective valves 60.

As shown in FIGS. 1 and 2, unit 6 also comprises a control unit 61 in turn comprising a known computer 62 to which sensors 63 and 64 transmit the position and movement of heads 2, and the presence and position of element 3 on each head 2 traveling through station 4. In other words, given the arrangement of the gumming portions (not shown) on each element 3, the arrangement of heads 2 about wheel 1, the movement of wheel 1 and the position of each element 3 on respective head 2 when this reaches station 4, computer 62 knows, instant by instant, the location of the gumming portions (not shown) on each element 3 as this travels through station 4.

Computer 62 is also supplied with signals by three sensors 65, 66, 67 respectively associated with devices 34, 42, 55 of each device 18, and is informed instant by instant of the coordinates of the outlet ends of nozzles 17 and the direction in which nozzles 17 are oriented.

Consequently, once spray devices 14 have been adjusted manually in directions 35 and 43, computer 62 is able to control motors 44, and may be so programmed as to direct jets of adhesive material onto the gumming portions (not shown) in a predetermined manner, which may obviously vary depending on the manner in which elements 3 are fed along path P. Computer 62 may also be so programmed as to control the opening frequency and time of valves 60.

The flexibility of unit 6 is such that the same result may be achieved in any number of ways, as demonstrated by the following example.

Assuming, as in the example shown, that unit 6 presents three spray devices 14, and adhesive material is to be applied to three elongated portions (not shown) of element 3, the three portions being of different length and located one over the other in a direction perpendicular to the FIG. 1 plane. Once devices 42 have been so adjusted that each of nozzles 17 is on a level with a respective gumming portion, various procedures may be adopted, depending on whether wheel 1 is operated continuously or in steps, with element 3 being arrested in station 4, and depending on whether the space between unit 6 and wheel 1 at station 4 is clear or not.

If wheel 1 is operated continuously, and an ample passage exists between unit 6 and wheel 1 for the jets emitted by nozzles 17, spray devices 14 may be left in the FIG. 1 position, and valves 60 may be opened differentially as the gumming portions travel past respective nozzles 17, which communicate with pump 58 for as long as it takes to coat the respective portions traveling past respective nozzles 17 at the surface speed of wheel 1. Obviously, given the speed at which adhesive material 5 issues from nozzles 17, the coordinates of nozzles 17 in relation to wheel 1, and the instantaneous distance between each nozzle 17 and the respective gumming portion, computer 62 is able to calculate the opening "advance" and frequency of valves 60 required for the jets to accurately strike the gumming portions. If valves 60 are impulse operated, computer 62 is able to supply different series of opening pulses to apply successive spots of gum to the gumming portions.

If wheel 1 is operated continuously, but only a relatively small passage exists between unit 6 and wheel 1 for the jets emitted by nozzles 17, spray devices 14 may be spaced further apart in direction 35 by means of devices 34, and nozzles 17 may be directed towards the passage by tilting spraying devices 14 in relation to one another by means of respective devices 55, so as to direct the respective jets onto points of element 3 substantially aligned along a line perpendicular to the FIG. 1 plane. Emission of the jets is controlled by computer 62 in the same way as described above, except that, in this case, when calculating the "advance", computer 62 must also take into account the different distances between nozzles 17 and the respective gumming portions.

If wheel 1 is step operated, part of the gumming operation may be performed when the wheel is stopped, and the remainder when it starts moving again and is so restored to the above condition. Obviously, in the event one of the three elongated portions is coated when wheel 1 is stationary, motor 44 of device 55 of the respective nozzle 17 will be operated continuously to oscillate the relative spray device 14.

As regards adjusting devices 55, it should be pointed out that these provide, using a single device 14, for easily gumming a number of spaced portions of element 3, arranged in a line parallel to path P.

The flexibility of unit 6 may of course be further enhanced by providing each spray device 14 with an adjusting device (not shown) similar to device 55 and for oscillating device 14 about an axis parallel to direction 43, and/or with a device (not shown) similar to device 34 and for adjusting the position of device 14 in a direction parallel to plate 8 and perpendicular to direction 35.

We claim:

1. In a spray gumming unit (6) for gumming a number of portions of sheet elements (3) traveling along a path (P) in a predetermined traveling direction, improvements of said spray gumming unit (6) comprising:

a support (8) mounted along a portion (P1) of said path (P);

at least two spray gumming devices (14) along said path, each comprising a nozzle (17) for supplying jets of adhesive material (5) in an ejection direction towards said path each of said nozzles being at a respective distances from said path;

a tank (57) for said adhesive material (5);

a respective conduit (16) for connecting each of said gumming devices (14) to said tank (57);

and a respective valve (60) connected to said tank for controlling fluid flow through said conduits (16); wherein the improvement comprising:

adjustable an connecting device respectively for each of said gumming devices (14), each of said adjustable connecting devices (18) being interposed between one of said gumming devices (14) and said support (8) for varying said ejection direction and distance of one of said gumming devices independently of the ejection direction and distance of said other of said gumming device (14), each of said adjustable connecting device (18) respectively comprising actuating an means (44, 52) for rotating each of said gumming device (14) about an axis 24 extending transversely of said predetermined traveling direction.

2. The unit as claimed in claim 1, wherein each of said adjustable connecting device (18) comprise a shaft (37) coaxial with said axis (24), connected at one to one of said gumming devices (14) and connected at a second end in a rotary manner to said support (8) and a first adjusting means (55) connected to said shaft for adjusting an angular position of said shaft (37) about said axis (24).

3. The unit as claimed in claim 2, wherein each of said first adjusting means (55) comprises powered drive means (44, 52) for imparting said angular position of said shaft (37) about said axis (24).

4. The unit as claimed in claim 2, wherein each of said first adjusting means (55) comprise powered drive means (44, 52) for oscillating said shaft (37) about said axis (24).

5. The unit as claimed in claim 2, wherein each of said adjustable connecting device (18) further comprising a second adjusting means (34, 42) for adjusting a position of one of said gumming devices (14) independently of the other of said gumming devices in a second direction (35, 43) perpendicular to varying said ejection direction.

6. The unit as claimed in claim 5, wherein one (43) of said directions (35, 43) is parallel to said axis (24).

7. The unit as claimed in claim 1, means further comprising:

control unit means (61) for selectively controlling each of said valves (60).

8. The unit as claimed in claim 7, wherein said control unit means (61) comprises:

a computer (62);

a first detecting means (63, 64) for detecting positions of said sheet elements (3) along said path (P); and a second detecting means (65, 66, 67) for detecting a position in space of each of said nozzles (17);

wherein said first (63, 64) and second (65, 66, 67) detecting means are connected to respective inputs of said computer (62).

9. The unit as claimed in claim 8, wherein said computer (62) comprises:

a first output connected to said each of valves (60); and a second output connected to each of said actuating means (44, 52).

* * * * *